(12) United States Patent
Wu et al.

(10) Patent No.: US 12,016,023 B2
(45) Date of Patent: Jun. 18, 2024

(54) DATA SENDING METHOD AND TERMINAL

(71) Applicant: Vivo Mobile Communication Co., Ltd., Chang'an Dongguan (CN)

(72) Inventors: Yumin Wu, Chang'an Dongguan (CN); Wei Bao, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 467 days.

(21) Appl. No.: 17/333,144

(22) Filed: May 28, 2021

(65) Prior Publication Data

US 2021/0289491 A1    Sep. 16, 2021

Related U.S. Application Data

(63) Continuation of application No. PCT/CN2019/121232, filed on Nov. 17, 2019.

(30) Foreign Application Priority Data

Dec. 14, 2018   (CN) .......................... 201811535437.X

(51) Int. Cl.
    *H04W 72/21*      (2023.01)
    *H04L 1/1812*     (2023.01)
    *H04L 1/1867*     (2023.01)
    *H04W 72/0446*    (2023.01)
    *H04W 80/02*      (2009.01)

(52) U.S. Cl.
    CPC .......... *H04W 72/21* (2023.01); *H04L 1/1819* (2013.01); *H04L 1/1874* (2013.01); *H04W 72/0446* (2013.01); *H04W 80/02* (2013.01)

(58) Field of Classification Search
    CPC . H04W 72/21; H04W 72/0446; H04W 80/02; H04L 1/1819; H04L 1/1874; H04L 1/188; H04L 1/1893; H04L 1/1822; H04L 1/1806; H04L 1/1812
    See application file for complete search history.

(56) References Cited

U.S. PATENT DOCUMENTS

2004/0192308 A1    9/2004  Lee
2006/0156162 A1    7/2006  Choi et al.
(Continued)

FOREIGN PATENT DOCUMENTS

CN    101478381 A    7/2009
CN    101841403 A    9/2010
(Continued)

OTHER PUBLICATIONS

Office Action from Chinese Patent Office dated Oct. 28, 2020, in related application 201811535437.X.
(Continued)

*Primary Examiner* — Yu-Wen Chang
(74) *Attorney, Agent, or Firm* — von Briesen & Roper, s.c.

(57) ABSTRACT

A data sending method and a terminal are provided. The method includes: if a PHY layer has not sent first data on a first semi-persistent uplink sending resource after a MAC layer of the terminal transmits the first data to the PHY layer, the PHY layer sends second data on a second semi-persistent uplink sending resource, where the second data is the first data buffered in a hybrid automatic repeat request (HARQ) process, or the second data is data corresponding to the first data buffered in the HARQ process.

20 Claims, 2 Drawing Sheets

(56) References Cited

U.S. PATENT DOCUMENTS

| | | | |
|---|---|---|---|
| 2009/0287976 A1 | 11/2009 | Wang | |
| 2017/0054541 A1 | 2/2017 | Olsson | |
| 2017/0332358 A1* | 11/2017 | Park | H04L 1/1671 |
| 2018/0048432 A1* | 2/2018 | Sun | H04L 1/1819 |
| 2018/0279274 A1* | 9/2018 | Sun | H04W 52/367 |
| 2019/0007176 A1* | 1/2019 | Ozturk | H04L 1/1816 |
| 2019/0150180 A1* | 5/2019 | Zou | H04L 1/1822 |
| | | | 370/329 |
| 2019/0215907 A1* | 7/2019 | Phuyal | H04W 76/27 |
| 2019/0245657 A1* | 8/2019 | Lee | H04W 80/02 |
| 2020/0228250 A1* | 7/2020 | Cheng | H04L 1/1835 |
| 2020/0267591 A1 | 8/2020 | Wu | |
| 2020/0366423 A1* | 11/2020 | Lee | H04L 1/1887 |
| 2021/0100001 A1* | 4/2021 | Höglund | H04L 5/0053 |

FOREIGN PATENT DOCUMENTS

| | | |
|---|---|---|
| CN | 101971547 A | 2/2011 |
| CN | 102158972 A | 8/2011 |
| CN | 108352944 A | 7/2018 |
| CN | 108429607 A | 7/2018 |
| CN | 108631940 A | 10/2018 |
| CN | 108632901 A | 10/2018 |
| KR | 20060060488 A | 6/2006 |
| WO | 2017204734 A1 | 11/2017 |

OTHER PUBLICATIONS

Written Opinion and International Preliminary Report on Patentability dated Jun. 24, 2021, in related application PCT/CN2019/121232, filed Nov. 27, 2019.

Extended European Search Report related to Application No. 19895478.6 reported on Dec. 23, 2021.

R2-1713881—Source: LG Electronic Inc., "RAN2 aspect for HARQ In NR", Agenda Item: 10.3.1.9 (NR_newRAT-Core), Document for; Discussion and Decision, 3GPP TSG-RAN WG2 Meeting #100, Reno, USA, Nov.-Dec. 1, 2018.

3GPP TS 25.321 V3.16. 3rd Generation Partnership Project; Technical Specification Group Radio Access Network; Medium Access Control (MAC) protocol specification; (Release 1999) V3.16.0 (Sep. 2003).

Korean first Office Action related to application No. 10-2021-7017034; reported on Mar. 7, 2023,.

* cited by examiner

DATA SENDING METHOD AND TERMINAL

CROSS-REFERENCE OF RELATED APPLICATION

This application is a continuation application of a PCT Application No. PCT/CN2019/121232 filed on Nov. 27, 2019, which claims priority to Chinese Patent Application No. 201811535437.X, filed on Dec. 14, 2018 in china, the disclosures of which are incorporated herein by reference in their entireties.

TECHNICAL FIELD

The present disclosure relates to the field of communications technologies, and in particular, to a data sending method and a terminal.

BACKGROUND

In a communication system (for example: a 5G system), a network side can configure semi-persistent uplink sending resources for a terminal. The network side can allocate a fixed hybrid automatic repeat request (HARQ) process for data sending of these semi-persistent uplink sending resources. In addition, when a terminal uses a semi-persistent uplink sending resource to send data, a media access control (MAC) layer of the terminal buffers to-be-sent data to a HARQ process, sends the to-be-sent data to a physical (PHY) layer, and instructs the PHY layer to send data. However, in actual applications, the PHY layer may fail to send data due to some reasons. However, the semi-persistent uplink sending resource in the communication system is used to send new data. Therefore, when the PHY layer cannot send the data, the MAC layer of the terminal uses the HARQ process to send new data, that is, uses the new data to overwrite the data buffered in the HARQ process, and the PHY layer also sends the new data. As a result, the data previously buffered in the HARQ process is directly lost, and data transmission performance of the terminal is relatively low.

SUMMARY

The embodiments of the present disclosure provide a data sending method and a terminal.

According to a first aspect, some embodiments of this disclosure provide a data sending method, applied to a terminal. The method includes:

if a PHY layer has not sent first data on a first semi-persistent uplink sending resource after a MAC layer of the terminal transmits the first data to the PHY layer, the PHY layer sends second data on a second semi-persistent uplink sending resource, where the second data is the first data buffered in a HARQ process, or the second data is data corresponding to the first data buffered in the HARQ process.

According to a second aspect, some embodiments of this disclosure provide a terminal. The terminal includes:

a sending module, configured to: if a PHY layer has not sent first data on a first semi-persistent uplink sending resource after a MAC layer of the terminal transmits the first data to the PHY layer, the PHY layer, send second data on a second semi-persistent uplink sending resource, where the second data is the first data buffered in a HARQ process, or the second data is data corresponding to the first data buffered in the HARQ process.

According to a third aspect, some embodiments of the present disclosure provide a terminal, including: a memory, a processor, and a program stored in the memory and executable on the processor. The program, when executed by the processor, implements the steps of the data sending method provided by some embodiments of the present disclosure.

According to a fourth aspect, some embodiments of the present disclosure provide a computer-readable storage medium. The computer-readable storage medium stores a computer program, and the computer program, when executed by the processor, implements the steps of the data sending method provided by some embodiments of the present disclosure.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of this disclosure, the term such as "exemplary" or "for example" is used to represent an example, an instance, or an illustration. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The embodiments of the present disclosure are described below with reference to the accompanying drawings. A data sending method and a terminal provided in some embodiments of this disclosure may be applied to a wireless communications system. The wireless communications system may be a 5G system, an evolved long term evolution (eLTE) system, or a subsequent evolved communications system.

Figure 1:
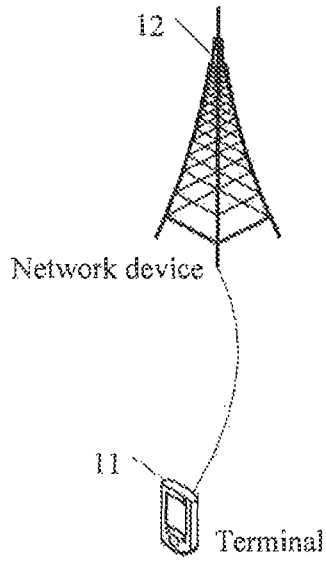
FIG. 1 is a structural diagram of a network system that can be applied to some embodiments of the present disclosure.

FIG. 1 is a structural diagram of a network system that can be applied to some embodiments of the present disclosure. As shown in FIG. 1, the network system includes: a terminal 11 and a network device 12, where the terminal 11 may be a user terminal (UE) or other terminal side device, for example, may be a terminal side device such as a mobile phone, a tablet personal computer, a Laptop Computer, a personal digital assistant (PDA for short), a mobile internet device (MID), or a wearable device. It should be noted that a specific type of the terminal 11 is not limited in some embodiments of the present disclosure. The network device 12 may be a base station in 4G, 5G, or later releases, or a base station in other communications systems, or is referred to as a Node B, an Evolved Node B, a transmission reception point (TRP), an access point (AP), or other words in the field, as long as the same technical effect is achieved. The network device is not limited to specific technical words. In addition, the network device 12 may be a master node (MN) or a secondary node (SN). It should be noted that in some embodiments of the present disclosure, only the 5G base station is used as an example, but a specific type of the network device is not limited.

Figure 2:
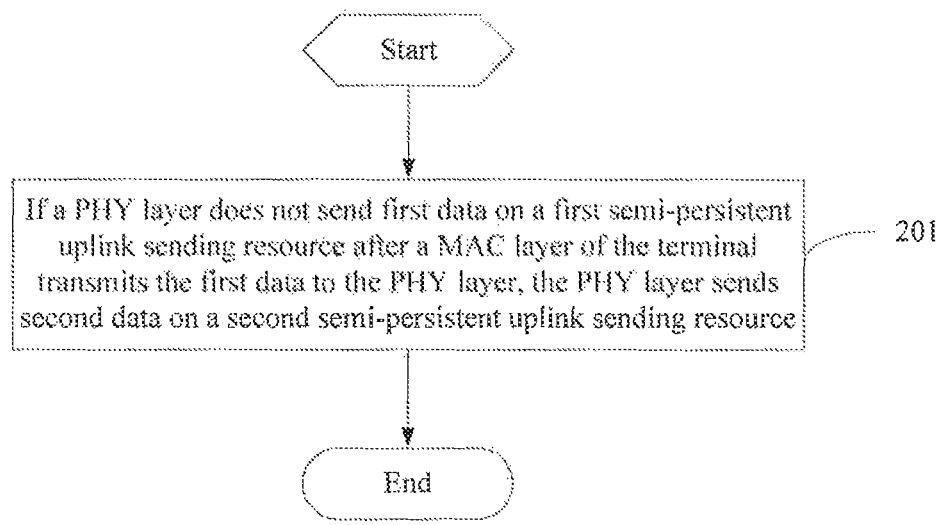
FIG. 2 is a flowchart of a data sending method according to some embodiments of the present disclosure.

FIG. 2 is a flowchart of a data sending method according to some embodiments of this disclosure. The method is applied to a terminal, and as shown in FIG. 2, includes the following steps.

Step 201: If a PHY layer has not sent first data on a first semi-persistent uplink sending resource after a MAC layer of the terminal transmits the first data to the PHY layer, the PHY layer sends second data on a second semi-persistent uplink sending resource, where the second data is the first data buffered in a HARQ process, or the second data is data corresponding to the first data buffered in the HARQ process.

That the MAC layer of the terminal transmits the first data to the PHY layer may be: when the terminal uses the HARQ process to send the first data on the first semi-persistent uplink sending resource, the MAC layer buffers the first data in the HARQ process, transmits the first data to the PHY layer, and may instruct the PHY layer to send the data on the first semi-persistent uplink sending resource. For example, the terminal has data that is to be sent on the first semi-persistent uplink sending resource. In this case, the terminal generates a data packet corresponding to sending of the uplink data, such as, a MAC protocol data unit (PDU), and uses the HARQ process corresponding to the semi-persistent uplink sending resource to send the data, that is, the MAC layer transmits the first data to the PHY layer.

However, that the PHY layer has not sent the first data on the first semi-persistent uplink sending resource may be: the PHY layer cannot send the first data on the first semi-persistent uplink sending resource for some reasons. For example, uplink transmit power of the terminal is insufficient in a cell of the first semi-persistent uplink sending resource, or the first data cannot be sent because a frequency corresponding to the first semi-persistent uplink sending resource is congested (for example, channel access failure), etc.

Figure 3:
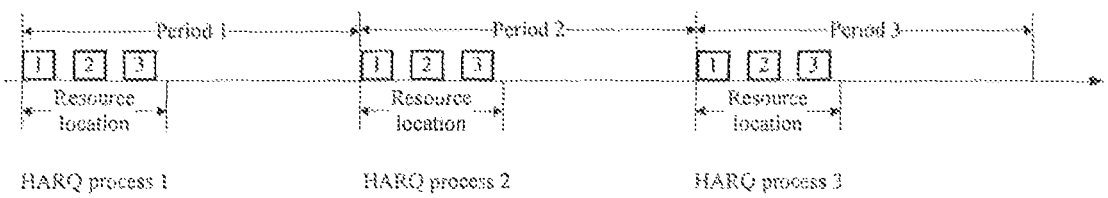
FIG. 3 is a schematic diagram of resource configuration according to some embodiments of the present disclosure.

In addition, the first semi-persistent uplink sending resource may be a semi-persistent uplink sending resource corresponding to the HARQ process, for example, the network device configures that the HARQ process is used to send data on the first semi-persistent uplink sending resource. The second semi-persistent uplink sending resource can also be a semi-persistent uplink sending resource corresponding to the HARQ process. For example, as shown in FIG. 3, the network device configures multiple semi-persistent uplink sending resources for the terminal in multiple period intervals. As shown in FIG. 3, 3 semi-persistent uplink sending resources are allocated in each period, where 3 periods correspond to 3 HARQ process, that is, a corresponding HARQ process is used for data sending in each period. Of course, in some embodiments of the present disclosure, allocation of the resource and the HARQ process is not limited to that shown in FIG. 3, and may be specifically: the number of HARQ processes available in each period is less than the number of resources available in each sending period. For example, the number of semi-persistent uplink sending resources available in each sending period is 3, and the number of HARQ processes available in each period is 1 or 2.

In addition, when the second data is the first data buffered in the HARQ process, it can be understood as that the PHY layer continues to send, on the second semi-persistent uplink sending resource, the first data buffered in the HARQ process. When the second data is data corresponding to the first data buffered in the HARQ process, a part of the first data buffered in the HARQ process can be sent on the second semi-persistent uplink sending resource, or the first data buffered in the HARQ process may be used to newly construct the second data and the second data related to the first data is sent.

In addition, a redundancy version (RV) of the second data is agreed upon by a protocol or configured in a network. The RV of the second data may be an RV of sending data in the HARQ process. For example, the RV is configured as RV0, or configured to be the same as an RV of previous data sending of the HARQ process. For example, an RV of sending first data in the HARQ process is 0, and an RV of sending second data in the HARQ process is also 0, that is, the RVs of the two pieces of data can be the same. Of course, in some scenarios, they can be different and this is not limited.

It should be noted that in some embodiments of the present disclosure, the semi-persistent uplink sending resource may be configured in advance by the network for the terminal, that is, before the terminal sends the first data, the first semi-persistent uplink sending resource and the second semi-persistent uplink sending resource have been configured for the terminal in advance.

For example, before performing step 201, the terminal receives configuration information of the semi-persistent uplink sending resource configured by the network, where the resource may be the resource shown in FIG. 3. The type of the semi-persistent uplink sending resource of the configuration may include at least one of the following: uplink configured grant type 1 (UL configured grant Type 1) and uplink configured grant type 2 (UL configured grant Type 2).

The uplink configured grant type 1 and the uplink configured grant type 2 may be an uplink configured grant type defined in a protocol.

In addition, the configuration information includes one or any combination of more of the following:

a sending period;

start resource location information; and a resource location available for each sending period.

For example, the sending period is 5 ms or 10 ms, and the start resource location information can be a resource location with a system frame number (SFN) 1 and a slot 1.

For example, starting from a start resource location, a bitmap indicates a resource location among 10 consecutive slots (10 bits, where each bit corresponds to 1 slot location) that is an available semi-persistent uplink sending resource. The bit value 1 indicates available and the bit value 0 indicates unavailable. Alternatively, multiple available resource locations can also be resources in different frequency ranges (e.g., cells); or the multiple available resource locations can also be resources in different spatial ranges (e.g., beams), etc.

In addition, the number of HARQ processes available in each period is less than the number of resources available in each sending period. For example, as shown in FIG. 3, the number of HARQ processes available in each period is 1, and the number of resources available in each sending period is 3.

In some embodiments of the present disclosure, through the above steps, when the PHY layer has not sent the first data on the first semi-persistent uplink sending resource, the second data is sent on the second semi-persistent uplink sending resource. Therefore, this can avoid directly dropping the data that is not sent by the PHY layer, to improve the data transmission performance of the terminal.

As an optional implementation, the HARQ process buffers the first data within the time span of the second semi-persistent uplink sending resource.

It should be noted that the HARQ process buffers the first data within the time span of the second semi-persistent uplink sending resource when the PHY layer has not sent the first data on the first semi-persistent uplink sending resource.

The time span of the second semi-persistent uplink sending resource may be a time resource of the second semi-persistent uplink sending resource. Because the HARQ process buffers the first data within the time span of the second semi-persistent uplink sending resource, in step 201, the second data can be directly sent based on the buffered first data, thereby reducing the complexity of sending the second data.

In addition, this implementation can be implemented in the following implementations:

Implementation 1: the MAC layer prohibits data sending through the second semi-persistent uplink sending resource.

That the MAC layer prohibits data sending through the second semi-persistent uplink sending resource can also be understood as that the MAC layer does not use the second semi-persistent uplink sending resource for data sending.

In this implementation, because the MAC layer prohibits data sending through the second semi-persistent uplink sending resource, it can be ensured that the HARQ process buffers the first data within the time span of the second semi-persistent uplink sending resource.

Optionally, the terminal starts a first timer of the HARQ process, during the operation of the first timer, the MAC layer prohibits data sending through a semi-persistent uplink sending resource corresponding to the HARQ process, and the semi-persistent uplink sending resource corresponding to the HARQ process at least includes the second semi-persistent uplink sending resource.

The first timer can be a timer that corresponds to the HARQ process of the terminal and that is configured in the network or agreed upon by a protocol, for example, duration of the timer is 20 ms.

The first timer may be started when the terminal uses the HARQ process to send the first data, for example, when the MAC layer transmits the first data to the PHY layer, or when the MAC layer generates the first data.

In this implementation, because during the operation of the first timer, the MAC layer prohibits data sending through the semi-persistent uplink sending resource corresponding to the HARQ process, the timer is started after the MAC layer of the terminal submits the data to the PHY, and the HARQ process is not used by the MAC layer to send data during the operation of the timer, so as to ensure the performance of the terminal and prevent the MAC from not sending data for a long time.

The following describes an example of the implementation of the first timer:

The terminal starts the first timer, and during the operation of the timer, the MAC layer does not use the semi-persistent uplink sending resource corresponding to the HARQ process corresponding to the timer to send data.

For example, as shown in FIG. 3, the MAC layer of the terminal uses HARQ process 1 to send data on resource 1 of period 1, and the MAC layer of the terminal starts the first timer. At this time, the PHY layer of the terminal cannot send the data because of specific reasons, and in this case, the first timer is still started or continues to run. The specific reasons can be that uplink transmit power of the cell of the sending resource is insufficient, or frequency channel access corresponding to the sending resource fails, for example, listen-before-talk (LBT) fails.

During the operation of the timer corresponding to the HARQ process, the MAC layer of the terminal does not use a subsequent semi-persistent uplink sending resource corresponding to the HARQ process for data sending, and the PHY layer of the terminal continues to use the subsequent semi-persistent uplink sending resource corresponding to the HARQ process for data sending, for example, the PHY layer continues to attempt to send the first data until the first data is sent. For example, as shown in FIG. 3, during the operation of the first timer corresponding to HARQ process 1, the MAC layer of the terminal does not use sending resource 2 and/or resource 3 corresponding to HARQ process 1 of period 1 for data sending, for example, the MAC layer of the terminal does not generate new data (for example, generate a new MAC PDU) according to sending resource 2 and/or resource 3 to overwrite the first data buffered in HARQ process 1; or gives up the resource. The PHY layer of the UE continues to send, on the sending resource 2 and/or resource 3, the first data buffered in the HARQ process 1 until the first data is sent.

When the PHY layer continues to send, on the sending resource 2 and/or resource 3, the first data buffered in the HARQ process 1, the RV of sending data in the HARQ process 1 is agreed upon by the protocol or configured in the network, for example, is RV0 or is the same as an RV of previous sending of the HARQ process (for example, an RV of sending in the HARQ process 1 on resource 1 is 0 and an RV of sending in the HARQ process 1 on resource 2 is also 0).

Implementation 2: the MAC layer transmits the second data to the PHY layer on the second semi-persistent uplink sending resource according to the first data buffered in the HARQ process.

Because the second data may be the first data, the transferring the second data to the PHY layer according to the first data buffered in the HARQ may be transmitting the first data buffered in the HARQ to the PHY layer. When the second data is the data corresponding to the first data buffered in the HARQ process, the transmitting the second data to the PHY layer according to the first data buffered in the HARQ may be: determining the second data according to the first data and transmitting the second data to the PHY layer.

In this implementation, because the MAC layer transmits the second data to the PHY layer on the second semi-persistent uplink sending resource according to the first data buffered in the HARQ process, the MAC layer can send, on the second semi-persistent uplink sending resource, the first data buffered in the HARQ process. Therefore, this can avoid directly dropping the first data, to improve the communication performance of the terminal.

Optionally, if the MAC layer receives a non-sending indication, the MAC layer transmits the second data to the PHY layer on the second semi-persistent uplink sending resource according to the first data buffered in the HARQ process, where the non-sending indication is used to indicate that the PHY layer has not sent the first data on the first semi-persistent uplink sending resource.

The non-sending indication may be a status indication used to indicate that the PHY layer has not sent the first data on the first semi-persistent uplink sending resource, for example, an LBT failure indication, or a data sending failure indication, or a data drop indication. In addition, the non-sending indication may be transmitted to the MAC layer by the PHY layer, or the terminal may record the sending status of the PHY layer and then notify the MAC layer of the sending status.

Optionally, the second data is completely or partially the same as the first data, or the second data is data constructed by using the first data.

The data constructed above can be a MAC PDU newly constructed by using the first data.

In this implementation, because the MAC layer receives the non-sending indication, if the PHY layer has not sent the data after the MAC layer of the terminal transmits the data to the PHY layer, when the MAC layer uses the same HARQ process to send data on a subsequent send resource, the MAC layer retransmits the data buffered in the HARQ process, so as to prevent the MAC from overwriting the first data buffered in the HARQ process. Of course, some embodiments of the present disclosure are not restricted to send the non-sending indication to the MAC layer. For example, the MAC layer can use a data sending status of the HARQ process to determine that the PHY layer has not sent the first data on the first semi-persistent uplink sending resource.

Further, if the MAC layer receives a sending indication, the MAC layer may prohibit data sending through a semi-persistent uplink sending resource corresponding to the HARQ process, where the semi-persistent uplink sending resource corresponding to the HARQ process at least includes the second semi-persistent uplink sending resource, and the sending indication is used to indicate that the PHY layer has sent the first data on the first semi-persistent uplink sending resource.

Similarly, the sending indication may be transmitted to the MAC layer by the PHY layer, or the terminal may record the sending status of the PHY layer and then notify the MAC layer of the sending status. For example, the sending indication may be an LBT success indication or a data sending indication.

In this implementation, because the sending indication is received and the MAC layer prohibits data sending through the semi-persistent uplink sending resource corresponding to the HARQ process, if the network device fails to receive the first data after the PHY layer sends the first data, the terminal can retransmit the first data buffered in the HARQ process, thereby improving the reliability of data transmission.

The following describes an example of the implementation of the non-sending indication:

If data of a HARQ process of the terminal is not sent (for example, the PHY layer of the UE cannot send the data due to specific reasons), the terminal records data sending status information of the HARQ process and transmits it to the MAC layer. For example, the PHY layer of the terminal indicates, to the MAC layer, the non-sending indication indicating that the data has not been sent (e.g., an LBT failure indication or a data sending failure indication) or the sending indication indicating that data has been sent (e.g., an LBT success indication or a data sending indication).

In this way, if the data sending status of the HARQ process is "not sent", the terminal transmits, on a subsequent semi-persistent uplink sending resource corresponding to the HARQ process, the first data buffered in the HARQ process. For example, as shown in FIG. 3, on sending resource 2 and/or resource 3 corresponding to HARQ process 1 of period 1, the terminal determines that the data of the sending resource 1 in the period 1 has not been successfully sent in the HARQ process 1, and sends, on the sending resource 2 and/or resource 3, the data buffered in the HARQ process 1. That is, the MAC layer transmits the second data to the PHY layer on sending resource 2 and/or resource 3 according to the first data buffered in the HARQ process, and the PHY layer sends the second data on sending resource 2 and/or resource 3. In addition, when the terminal sends, on a subsequent semi-persistent uplink sending resource corresponding to the HARQ process, the first data buffered in the HARQ process, the "sent data" and the "data buffered in the HARQ process" can be the same, partially the same, or completely different, that is, the first data and the second data can be the same, partially the same, or completely different. For example, MAC PDUs are the same, or the data buffered in the HARQ process is used to reconstruct a MAC PDU. In addition, an RV version of sending data in the HARQ process 1 is agreed upon by a protocol or configured in a network (e.g., RV0).

If the data sending status of the HARQ process is "already sent", the terminal does not use a subsequent semi-persistent uplink sending resource corresponding to the HARQ process to transmit data. As shown in FIG. 3, on sending resource 2 and/or resource 3 corresponding to HARQ process 1 of period 1, the terminal determines that the data of the sending resource 1 in the period 1 has been successfully sent in the HARQ process 1, and does not use resource 2 and/or resource 3 to send the data. It should be noted that the successful sending herein can be understood as that the PHY layer sends data, and does not mean that the network device receives the data successfully.

In the foregoing implementation, further, if the MAC layer receives the sending indication, the MAC layer may start a second timer of the HARQ process, and during the operation of the second timer, the MAC layer prohibits data sending through a semi-persistent uplink sending resource corresponding to the HARQ process.

For the second timer, reference may be made to the description of the first timer, which is not repeated herein.

In this implementation, because the MAC layer prohibits data sending through the semi-persistent uplink sending resource corresponding to the HARQ process during the operation of the second timer, this can improve the reliability of data transmission and can prevent the MAC layer from giving up excessive resources, to further improve the transmission performance of the terminal.

Further, if there is no data in the buffer of the HARQ process within the time of the semi-persistent uplink sending resource corresponding to the HARQ process, the MAC layer may generate new data and transmit the new data to the PHY layer.

In this implementation, when the second timer does not run, if there is no data in the buffer of the HARQ process, the MAC layer may generate new data and transmit the new data to the PHY layer.

The following describes an example of the implementation of the second timer:

The terminal records data sending status information of the HARQ process, and the status information includes one or any combination of more of the following: "already sent (that is, the sending indication)" and "not sent (that is, the non-sending indication)". According to the data sending status information of the HARQ process, it is determined whether to run the second timer corresponding to the HARQ process. For example, if data of the HARQ process is "not sent", the second timer corresponding to the HARQ process is not run; otherwise, the timer is run. During the operation of the second timer, the terminal does not use the semi-persistent uplink sending resource corresponding to the HARQ process corresponding to the timer to send data.

The status information may be provided by the PHY layer to the MAC layer. For example, the PHY layer indicates a data sending status to the MAC layer after the data is not sent. The status information may be indication information indicating that the transmission is unsuccessful, such as an LBT failure indication or a data drop indication. The MAC layer does not run the second timer after receiving the indication information; or the PHY layer indicates a data sending status to the MAC layer after the data is sent, for example, indication information indicates successful sending such as an LBT success indication or a data transfer indication. The MAC layer runs the second timer after receiving the indication information.

During the operation of the second timer corresponding to the HARQ process, the terminal (for example, the MAC layer) does not use a subsequent semi-persistent uplink sending resource corresponding to the HARQ process for data sending. For example, as shown in FIG. 3, during the operation of the timer corresponding to HARQ process 1, the MAC layer of the terminal does not use sending resource 2 and/or resource 3 corresponding to HARQ process 1 of period 1 for data sending, for example, the MAC layer does not generate new data (for example, does not generate a new MAC PDU) according to sending resource 2 and/or resource 3 to overwrite the data buffered in HARQ process 1; or gives up the resource.

During the operation of the second timer corresponding to the HARQ process, the terminal (for example, the MAC layer) uses a subsequent semi-persistent uplink sending resource corresponding to the HARQ process for data sending. The data sending method includes one or any combination of more of the following:

If there is data in the buffer of the HARQ process (for example, data has been sent before), the terminal (for example, the MAC layer) directly sends the data in the buffer of the HARQ process when using the semi-persistent uplink sending resource for sending. For example, as shown in FIG. 3, the terminal generates data on the sending resource 1 corresponding to the HARQ process 1 of period 1, but has not sent the data. In this case, there is buffered HARQ data generated by the UE for resource 1 in the HARQ process 1. The sending resource 2 corresponding to the HARQ process 1 of period 1 is used to send the data buffered in the HARQ process 1. The sending can be new transmission or retransmission, and the RV of sending in the HARQ process is agreed upon by a protocol or configured in a network.

If there is no data in the buffer of the HARQ process (for example, no data has been sent before), when the terminal (for example, the MAC layer) uses the semi-persistent uplink sending resource for sending, the terminal generates new data and transmits the new data through the HARQ process.

Optionally, in another implementation, the terminal sets a status of the HARQ process to transmission failure (for example, NACK), and the MAC layer transmits the second data to the PHY layer on the second semi-persistent uplink sending resource according to the first data buffered in the HARQ process includes:

the MAC layer on the second semi-persistent uplink sending resource retransmits the first data buffered in the HARQ process, where the second data is the first data buffered in the HARQ process.

Setting the state of the HARQ process to transmission failure may be setting the state of the HARQ process to transmission failure by default, so that the PHY layer does not send the first data on the first semi-persistent uplink sending resource, and the first data may be retransmitted, that is, both the MAC layer and the PHY layer retransmit the first data.

In this implementation, because the status of the HARQ process is set to transmission failure, when the MAC layer of the terminal uses the HARQ process for data sending, the status of the HARQ process may be set to NACK (that is, it is considered by default that sending of the data fails and the data needs to be retransmitted). If the PHY layer has not sent the data, the MAC layer uses the same HARQ process for data retransmission on a subsequent transmission resource, thereby effectively ensuring the reliability of transmission of the first data.

In addition, in this implementation, a timer of the HARQ process may also be started, for example, the first timer or the second timer. The following describes an example of this case:

When the terminal uses the HARQ process for data transmission, the state of the HARQ process is set to transmission failure (that is, NACK). Specifically, it may be considered by default that sending of the data fails and the data needs to be retransmitted.

If the terminal (for example, the PHY layer) has sent the data, the UE starts the timer corresponding to the HARQ process. If the terminal (for example, the PHY layer) has not sent the data, the terminal does not start the timer corresponding to the HARQ process. For example, as shown in FIG. 3, the HARQ process 1 of the terminal sends data on resource 1 of period 1, and the terminal starts the timer corresponding to the HARQ process 1; otherwise, the timer corresponding to the HARQ process 1 is not started. The PHY layer has not sent status information of the data, and refer to the above-mentioned non-sending indication or sending indication, which is not be repeated herein.

If the timer corresponding to the HARQ process of the terminal runs, the terminal does not use a subsequent semi-persistent uplink transmission resource corresponding to the HARQ process for data sending. For example, the timer corresponding to HARQ process 1 is running, and on resource 2 and/or resource 3 of period 1, the terminal does not use the resource 2 and/or 3 for uplink data transmission, for example, the MAC layer does not use the resource to generate a MAC PDU.

If the timer corresponding to the HARQ process of the terminal does not run, the terminal uses a subsequent semi-persistent uplink transmission resource corresponding to the HARQ process for data sending. For example, because the status corresponding to HARQ process 1 is NACK, the terminal transmits data on the semi-persistent uplink sending resource (for example: resource 2 and/or resource 3 of period 1 and/or resource 1/2/3 of period 3) corresponding to the HARQ process (for example, retransmission in HARQ process 1). That is, the terminal cannot use the semi-persistent uplink sending resource corresponding to HARQ process 2 to perform retransmission in the HARQ process. An RV version of sending data in the HARQ process 1 is agreed upon by a protocol or configured in a network (for example, RV0).

As an optional implementation, the terminal maintains at least one of a third timer and a counter of the HARQ, the third timer is started when the MAC layer transmits the first data to the PHY layer for the first time, and the counter is used to count a total number of times the terminal attempts to send the first data and the second data; and if the third timer reaches a first threshold and/or the counter reaches a second threshold, the terminal does not retransmit the first data buffered in the HARQ process.

The third timer may be referred to as a data sending duration timer, and the counter may be referred to as a data sending times counter. In addition, the configuration of the third timer and the counter may be configured in a network or agreed upon by a protocol. For example, the threshold of the third timer may be 20 ms or 25 ms, and the threshold of the counter may be 10 times or 5 times.

In addition, that the counter counts the total number of times the terminal attempts to transmit the first data and the second data may be: the counter is incremented by 1 each time the terminal attempts to transmit the first data buffered in the HARQ process, for example, when the PHY layer tries to send the first data for the first time, the counter is increased by 1, and when the first data is not sent for the first time, the counter is also increased by 1 when the second data is sent for the second time, because the second data is data sent for the first data buffered in the HARQ process.

In this implementation, the third timer and the counter can be used to prevent the terminal from repeatedly attempting to send the first data for multiple times.

For example, the terminal maintains a data sending duration timer and/or a data sending times counter corresponding to data sending in the HARQ process. After the data sending duration timer and/or the data sending times counter reaches a threshold, the terminal does not continue to transmit the data buffered in the HARQ process. For example, the terminal starts the data sending duration timer when the HARQ process 1 sends new data for the first time. If the data sending duration timer expires, the terminal no longer continues to send the data buffered in the HARQ process. Specifically, the buffer of the HARQ process can be cleared, and/or new transmission or retransmission of data buffered in the HARQ process can be stopped. Alternatively, the UE (for example, the MAC layer) accumulates the data sending times counter each time the HARQ process 1 attempts to transmit the data buffered in the HARQ process (for example, each time the MAC layer attempts to send data once, the counter is increased by 1). If the data sending times counter reaches the threshold, the terminal no longer continues to send the data buffered in the HARQ process. Specifically, the buffer of the HARQ process can be cleared, and/or new transmission or retransmission of data buffered in the HARQ process can be stopped.

Further, if the PHY layer sends the first data, the third timer may be stopped, and/or the counter is reset.

Sending the first data by the PHY layer can be understood as sending the first data. In this way, the third timer can be stopped in time, and/or the counter can be reset to reduce power consumption of the terminal. For example, if the data of the HARQ process is sent, the terminal stops the data sending duration timer. Alternatively, if the data of the HARQ process is sent, the terminal resets the data sending times counter, for example, sets the counter to an initial value (for example, "0").

In some embodiments of the present disclosure, if a PHY layer has not sent first data on a first semi-persistent uplink sending resource after a MAC layer of the terminal transmits the first data to the PHY layer, the PHY layer sends second data on a second semi-persistent uplink sending resource, where the second data is the first data buffered in a hybrid automatic repeat request (HARQ) process, or the second data is data corresponding to the first data buffered in the HARQ process. In this way, because the second data is sent on the second semi-persistent uplink sending resource, compared with the related technology in which the data that is not sent by the PHY layer is directly dropped, some embodiments of the present disclosure can improve the data transmission performance of the terminal.

Figure 4:
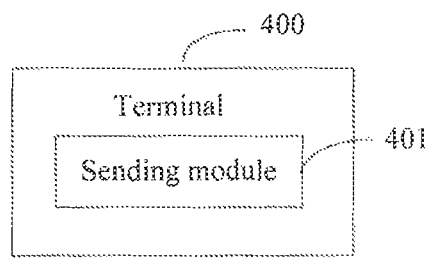
FIG. 4 is a structural diagram of a terminal according to some embodiments of the present disclosure.

Referring to FIG. 4, FIG. 4 is a structural diagram of a terminal according to some embodiments of the present disclosure. As shown in FIG. 4, a terminal 400 includes: a sending module 401, configured to: if a PHY layer has not sent first data on a first semi-persistent uplink sending resource after a MAC layer of the terminal transmits the first data to the PHY layer, send, by the PHY layer, second data on a second semi-persistent uplink sending resource, where the second data is the first data buffered in a HARQ process, or the second data is data corresponding to the first data buffered in the HARQ process.

Optionally, the HARQ process buffers the first data within the time span of the second semi-persistent uplink sending resource.

Optionally, the MAC layer prohibits data sending through the second semi-persistent uplink sending resource; or the MAC layer transmits the second data to the PHY layer on the second semi-persistent uplink sending resource according to the first data buffered in the HARQ process.

Optionally, the terminal starts a first timer of the HARQ process, during the operation of the first timer, the MAC layer prohibits data sending through a semi-persistent uplink sending resource corresponding to the HARQ process, and the semi-persistent uplink sending resource corresponding to the HARQ process at least includes the second semi-persistent uplink sending resource.

Optionally, if the MAC layer receives a non-sending indication, the MAC layer transmits the second data to the PHY layer on the second semi-persistent uplink sending resource according to the first data buffered in the HARQ process, where the non-sending indication is used to indicate that the PHY layer has not sent the first data on the first semi-persistent uplink sending resource.

Optionally, if the MAC layer receives a sending indication, the MAC layer prohibits data sending through a semi-persistent uplink sending resource corresponding to the HARQ process, where the semi-persistent uplink sending resource corresponding to the HARQ process at least includes the second semi-persistent uplink sending resource, and the sending indication is used to indicate that the PHY layer has sent the first data on the first semi-persistent uplink sending resource.

Optionally, if the MAC layer receives the sending indication, the MAC layer starts a second timer of the HARQ process, and during the operation of the second timer, the MAC layer prohibits data sending through a semi-persistent uplink sending resource corresponding to the HARQ process.

Optionally, if there is no data in the buffer of the HARQ process within the time of the semi-persistent uplink sending resource corresponding to the HARQ process, the MAC layer generates new data and transmits the new data to the PHY layer.

Optionally, the second data is completely or partially the same as the first data, or the second data is data constructed by using the first data.

Optionally, the terminal sets a status of the HARQ process to transmission failure, and the MAC layer transmits the second data to the PHY layer on the second semi-persistent uplink sending resource according to the first data buffered in the HARQ process includes: the MAC layer on the second semi-persistent uplink sending resource retransmits the first data buffered in the HARQ process, where the second data is the first data buffered in the HARQ process.

Optionally, the terminal maintains at least one of a third timer and a counter of the HARQ, the third timer is started when the MAC layer transmits the first data to the PHY layer for the first time, and the counter is used to count a total number of times the terminal attempts to send the first data and the second data; and if the third timer reaches a first threshold and/or the counter reaches a second threshold, the terminal does not retransmit the first data buffered in the HARQ process.

Optionally, if the PHY layer sends the first data, the third timer is stopped, and/or the counter is reset.

Optionally, a redundancy version of the second data is agreed upon by a protocol or configured by a network.

The above terminal can improve data transmission performance.

The terminal provided in some embodiments of the present disclosure can implement the processes implemented by the terminal in the method embodiment in FIG. 2. To avoid repetition, details are not described herein again. In addition, a communication delay of the terminal can be reduced.

Figure 5:
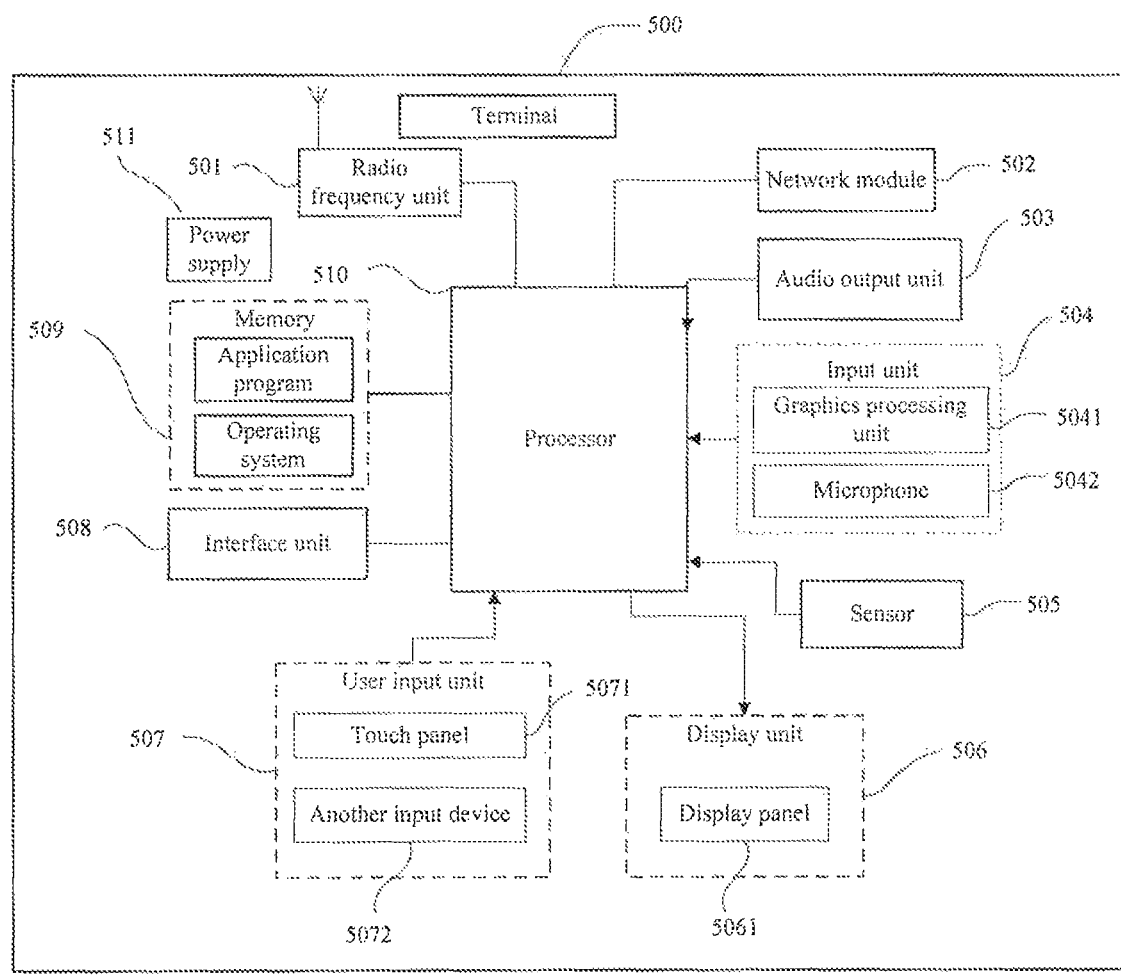
FIG. 5 is another structural diagram of a terminal according to some embodiments of the present disclosure.

FIG. 5 is a schematic diagram of a hardware structure of a terminal according to embodiments of this disclosure.

The terminal 500 includes, but is not limited to: a radio frequency unit 501, a network module 502, an audio output unit 503, an input unit 504, a sensor 505, a display unit 506, a user input unit 507, an interface unit 508, a memory 509, a processor 510, and a power supply 511. Those skilled in the art may understand that the terminal structure shown in FIG. 5 does not constitute a limitation on the terminal. The terminal may include more or fewer components than those shown in the figure, or some components may be combined, or there may be a different component arrangement. In some embodiments of the present disclosure, the terminal includes but is not limited to a mobile phone, a tablet computer, a notebook computer, a palmtop computer, an in-vehicle terminal, a wearable device, a pedometer, and the like.

The radio frequency unit 501 is configured to: if a PHY layer has not sent first data on a first semi-persistent uplink sending resource after a MAC layer of the terminal transmits the first data to the PHY layer, send, by the PHY layer, second data on a second semi-persistent uplink sending resource, where the second data is the first data buffered in a HARQ process, or the second data is data corresponding to the first data buffered in the HARQ process.

Optionally, the HARQ process buffers the first data within the time span of the second semi-persistent uplink sending resource.

Optionally, the MAC layer prohibits data sending through the second semi-persistent uplink sending resource; or the MAC layer transmits the second data to the PHY layer on the second semi-persistent uplink sending resource according to the first data buffered in the HARQ process.

Optionally, the terminal starts a first timer of the HARQ process, during the operation of the first timer, the MAC layer prohibits data sending through a semi-persistent uplink sending resource corresponding to the HARQ process, and the semi-persistent uplink sending resource corresponding to the HARQ process at least includes the second semi-persistent uplink sending resource.

Optionally, if the MAC layer receives a non-sending indication, the MAC layer transmits the second data to the PHY layer on the second semi-persistent uplink sending resource according to the first data buffered in the HARQ process, where the non-sending indication is used to indicate that the PHY layer has not sent the first data on the first semi-persistent uplink sending resource.

Optionally, if the MAC layer receives a sending indication, the MAC layer prohibits data sending through a semi-persistent uplink sending resource corresponding to the HARQ process, where the semi-persistent uplink sending resource corresponding to the HARQ process at least includes the second semi-persistent uplink sending resource, and the sending indication is used to indicate that the PHY layer has sent the first data on the first semi-persistent uplink sending resource.

Optionally, if the MAC layer receives the sending indication, the MAC layer starts a second timer of the HARQ process, and during the operation of the second timer, the MAC layer prohibits data sending through a semi-persistent uplink sending resource corresponding to the HARQ process.

Optionally, if there is no data in the buffer of the HARQ process within the time of the semi-persistent uplink sending resource corresponding to the HARQ process, the MAC layer generates new data and transmits the new data to the PHY layer.

Optionally, the second data is completely or partially the same as the first data, or the second data is data constructed by using the first data.

Optionally, the terminal sets a status of the HARQ process to transmission failure, and the MAC layer transmits the second data to the PHY layer on the second semi-persistent uplink sending resource according to the first data buffered in the HARQ process includes:
  the MAC layer on the second semi-persistent uplink sending resource retransmits the first data buffered in the HARQ process, where the second data is the first data buffered in the HARQ process.

Optionally, the terminal maintains at least one of a third timer and a counter of the HARQ, the third timer is started when the MAC layer transmits the first data to the PHY layer for the first time, and the counter is used to count a total number of times the terminal attempts to send the first data and the second data; and
  if the third timer reaches a first threshold and/or the counter reaches a second threshold, the terminal does not retransmit the first data buffered in the HARQ process.

Optionally, if the PHY layer sends the first data, the third timer is stopped, and/or the counter is reset.

Optionally, a redundancy version of the second data is agreed upon by a protocol or configured by a network.

The above terminal can improve data transmission performance.

It should be understood that, in some embodiments of the present disclosure, the radio frequency unit 501 may be configured to receive and send information or receive and send a signal in a call process. Specifically, after receiving downlink data from a base station, the radio frequency unit sends the downlink data to the processor 510 for processing. In addition, the radio frequency unit 501 sends uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may further communicate with another device by using a wireless communication system and network.

The terminal provides a user with wireless broadband Internet access through the network module 502, for example, helps the user send and receive emails, browse web pages, and access streaming media.

The audio output unit 503 may convert audio data received by the radio frequency unit 501 or the network module 502 or stored in the memory 509 into an audio signal and output as sound. Moreover, the audio output unit 503 may further provide audio output (for example, call signal receiving sound and message receiving sound) related to a specific function performed by the terminal 500. The audio output unit 503 includes a loudspeaker, a buzzer, a receiver, and the like.

The input unit 504 is configured to receive audio or video signals. The input unit 504 may include a graphics processing unit (GPU) 5041 and a microphone 5042. The graphics processing unit 5041 processes image data of a static picture or a video obtained by an image capturing apparatus (for example, a camera) in a video capturing mode or an image capturing mode. A processed image frame may be displayed on the display unit 506. The image frame processed by the graphics processing unit 5041 may be stored in the memory 509 (or another storage medium) or sent by using the radio frequency unit 501 or the network module 502. The microphone 5042 may receive sound and can process the sound into audio data. Processed audio data can be converted, in telephone call mode, into a format that can be sent to a mobile communication base station via the radio frequency unit 501 for output.

The terminal 500 further includes at least one sensor 505, such as a light sensor, a motion sensor, and other sensors. Specifically, the light sensor includes an ambient light sensor and a proximity sensor, where the ambient light sensor can adjust brightness of the display panel 5061 based on brightness of ambient light, and the proximity sensor can turn off the display panel 5061 and/or backlight when the terminal 500 moves towards the ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 505 may further include a fingerprint sensor, a pressure sensor, an iris sensor, a molecular sensor, a gyroscope, a barometer, a hygrometer, a thermometer, an infrared sensor, and the like. This is not described herein.

The display unit 506 is configured to display information entered by the user or information provided for the user. The display unit 506 may include the display panel 5061, and the display panel 5061 may be configured in a form of a liquid crystal display (LCD), an organic light-emitting diode (OLED), or the like.

The user input unit 507 can be configured to receive input numeric or character information, and generate key signal inputs related to user settings and function control of the terminal. Specifically, the user input unit 507 includes a touch panel 5071 and another input device 5072. The touch panel 5071, also referred to as a touchscreen, may collect a touch operation performed by the user on or near the touch panel 5071 (for example, an operation performed by the user on or near the touch panel 5071 by using any suitable object or accessory such as a finger or a stylus). The touch panel 5071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 510, and receives and executes a command sent by the processor 510. In addition, the touch panel 5071 may be implemented by using a plurality of types such as a resistive type, a capacitive type, an infrared ray, and a surface acoustic wave. The user input unit 507 may include another input device 5072 in addition to the touch panel 5071. Specifically, the another input device 5072 may include, but is not limited to, a physical keyboard, function keys (such as a volume control key and a switch key), a trackball, a mouse, and a joystick. Details are not described herein.

Further, the touch panel 5071 can cover the display panel 5061. When detecting a touch operation on or near the touch panel 5071, the touch panel 5071 transmits the touch operation to the processor 510 to determine a type of a touch event. Then the processor 510 provides corresponding visual output on the display panel 5061 based on the type of the touch event. Although in FIG. 5, the touch panel 5071 and the display panel 5061 are configured as two independent components to implement input and output functions of the terminal, in some embodiments, the touch panel 5071 and the display panel 5061 can be integrated to implement the input and output functions of the terminal. Details are not limited herein.

The interface unit 508 is an interface for connecting an external apparatus to the terminal 500. For example, the external apparatus may include a wired or wireless headset port, an external power supply (or a battery charger) port, a wired or wireless data port, a memory card port, a port for connecting an apparatus having an identification module, an audio input/output (I/O) port, a video 1/O port, a headset port, and the like. The interface unit 508 may be configured to receive input (for example, data information and power) from the external apparatus and transmit the received input to one or more elements in the terminal 500, or may be configured to transmit data between the terminal 500 and the external apparatus.

The memory 509 may be configured to store a software program and various data. The memory 509 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 509 may include a high-speed random access memory, or may include a non-volatile memory, for example, at least one disk storage device, a flash memory, or another volatile solid-state storage device.

The processor 510 is a control center of the terminal, and connects all parts of the entire terminal by using various interfaces and lines. By running or executing a software program and/or a module stored in the memory 509 and invoking data stored in the memory 509, the processor 510 performs various functions of the terminal and data processing, to perform overall monitoring on the terminal. The processor 510 may include one or more processing units. Optionally, the processor 510 may integrate an application processor with a modem processor. The application processor mainly processes the operating system, a user interface, the application program, and the like, and the modem processor mainly processes wireless communication. It may be understood that the foregoing modem processor may not be integrated into the processor 510.

The terminal 500 may further include the power supply 511 (for example, a battery) configured to supply power to various components. Optionally, the power supply 511 may be logically connected to the processor 510 through a power management system, so as to implement functions such as managing charging, discharging, and power consumption through the power management system.

In addition, the terminal 500 includes some functional modules not shown. Details are not described herein again.

Optionally, some embodiments of the present disclosure further provide a terminal, including a processor 510, a memory 509, and a computer program stored in the memory 509 and executable on the processor 510. When the computer program is executed by the processor 510, the processes of the foregoing embodiments of the data sending method are implemented, with the same technical effects achieved. To avoid repetition, details are not described herein again.

Some embodiments of this disclosure further provide a computer-readable storage medium. The computer-readable storage medium stores a computer program, and when the computer program is executed by a processor, the processes in the embodiments of the data sending method provided in the embodiments of this disclosure are implemented, and the same technical effect can be achieved. To avoid repetition, details are not described herein again. The computer-readable storage medium is, for example, a read-only memory (ROM for short), a random access memory (RAM for short), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present invention essentially or the part contributing to existing technologies may be implemented in a form of a software product. The computer software product is stored in a storage medium (for example, a ROM/RAM, a magnetic disk, or an optical disc) and includes several instructions for instructing a terminal (which may be a mobile phone, a computer, a server, an air conditioner, or a network device) to execute the methods described in the embodiments of the present invention.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer-readable storage medium. Based on this understanding, the essence of the technical solutions of this disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

Those of ordinary skill in the art can understand that some or all processes of the realization of the foregoing method in the embodiments can be implemented by controlling relevant hardware by the computer program. The foregoing program may be stored on a computer-readable storage medium, where when the program is executed, the processes of the embodiments of the foregoing methods can be included. The foregoing storage medium may include: a magnetic disk, an optical disc, a read-only memory (ROM), a random access memory (RAM), or the like.

It can be understood that those embodiments described in the embodiments of the present disclosure can be implemented by hardware, software, firmware, middleware, microcode, or a combination thereof. For implementation with hardware, the processing unit can be implemented in one or more application specific integrated circuits (ASIC), a digital signal processor (DSP), a digital signal processing device (DSP Device, DSPD), a programmable logic device (PLD), a field-programmable gate array (PFGA), general processors, controllers, micro-controllers, microprocessors, and another electronic unit for implementing the functions of the present application, or their combinations.

For implementation by software, technologies described in the embodiments of the present disclosure may be implemented by executing functional modules (for example, a process and a function) in the embodiments of the present disclosure. Software codes can be stored in the memory and executed by the processor. The memory can be implemented inside or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A data sending method, applied to a terminal, comprising:
if a physical (PHY) layer has not sent first data on a first semi-persistent uplink sending resource after a media access control (MAC) layer of the terminal buffers first data to a hybrid automatic repeat request (HARQ) process, and instructs the PHY layer to send the first data on the first semi-persistent uplink sending resource, transmitting by the PHY layer, a non-sending indication to the MAC layer;
instructing, by the MAC layer, the PHY layer to transmit second data on a second semi-persistent uplink sending resource upon receiving the non-sending indication; and
sending, by the PHY layer, the second data on the second semi-persistent uplink sending resource, wherein the second data is the first data buffered in the HARQ process, or the second data is data corresponding to the first data buffered in the HARQ process, and the non-sending indication is used to indicate that the PHY layer has not sent the first data on the first semi-persistent uplink sending resource.

2. The method according to claim 1, wherein the HARQ process buffers the first data within a time span of the second semi-persistent uplink sending resource.

3. The method according to claim 2, wherein the MAC layer prohibits data sending through the second semi-persistent uplink sending resource.

4. The method according to claim 3, wherein the terminal starts a first timer of the HARQ process, during operation of the first timer, the MAC layer prohibits data sending through a semi-persistent uplink sending resource corresponding to the HARQ process, and the semi-persistent uplink sending resource corresponding to the HARQ process at least comprises the second semi-persistent uplink sending resource.

5. The method according to claim 1, wherein the non-sending indication is a listen-before-talk (LBT) failure indication.

6. The method according to claim 1, wherein if the MAC layer receives a sending indication, the MAC layer prohibits data sending through a semi-persistent uplink sending resource corresponding to the HARQ process, wherein the semi-persistent uplink sending resource corresponding to the HARQ process at least comprises the second semi-persistent uplink sending resource, and the sending indication is used to indicate that the PHY layer has sent the first data on the first semi-persistent uplink sending resource.

7. The method according to claim 6, wherein if the MAC layer receives the sending indication, the MAC layer starts a second timer of the HARQ process, and during operation of the second timer, the MAC layer prohibits data sending through a semi-persistent uplink sending resource corresponding to the HARQ process.

8. The method according to claim 7, wherein if there is no data in a buffer of the HARQ process within the time span of the semi-persistent uplink sending resource corresponding to the HARQ process, the MAC layer generates new data and transmits the new data to the PHY layer.

9. The method according to claim 1, wherein the second data is completely or partially the same as the first data, or the second data is data constructed by using the first data.

10. The method according to claim 3, wherein
the MAC layer instructs the PHY layer, on the second semi-persistent uplink sending resource, to retransmit the first data buffered in the HARQ process.

11. The method according to claim 1, wherein the terminal maintains at least one of a third timer and a counter of the HARQ, the third timer is started when the MAC layer transmits the first data to the PHY layer for the first time, and the counter is configured to count a total number of times the terminal attempts to send the first data and the second data; and
if the third timer reaches a first threshold and/or the counter reaches a second threshold, the terminal does not retransmit the first data buffered in the HARQ process.

12. The method according to claim 11, wherein if the PHY layer sends the first data, the third timer is stopped, and/or the counter is reset.

13. The method according to claim 1, wherein a redundancy version of the second data is agreed upon by a protocol or configured by a network.

14. A terminal, comprising a memory, a processor, and a program stored in the memory and executable on the processor, wherein when the program is executed by the processor, the processor is configured to implement the following step:
if a physical (PHY) layer has not sent first data on a first semi-persistent uplink sending resource after a media access control (MAC) layer of the terminal buffers first data hybrid automatic repeat request (HARQ) process, and instructs the PHY layer to send the first data on the first semi-persistent uplink sending resource, transmitting, by the PHY layer, a non-sending indication to the MAC layer;

instructing by the MAC layer, the PHY layer to transmit second data on a second semi-persistent uplink sending resource upon receiving the non-sending indication; and sending, by the PHY layer, the second data on the second semi-persistent uplink sending resource, wherein the second data is the first data buffered in the HARQ process, or the second data is data corresponding to the first data buffered in the HARQ process, and the non-sending indication is used to indicate that the PHY laver has not sent the first data on the first semi-persistent uplink sending resource.

15. The terminal according to claim 14, wherein the HARQ process buffers the first data within a time span of the second semi-persistent uplink sending resource.

16. The terminal according to claim 15, wherein the MAC layer prohibits data sending through the second semi-persistent uplink sending resource.

17. The terminal according to claim 16, wherein the terminal starts a first timer of the HARQ process, during operation of the first timer, the MAC layer prohibits data sending through a semi-persistent uplink sending resource corresponding to the HARQ process, and the semi-persistent uplink sending resource corresponding to the HARQ process at least comprises the second semi-persistent uplink sending resource.

18. The terminal according to claim 14, wherein the non-sending indication is a listen-before-talk (LBT) failure indication.

19. The terminal according to claim 14, wherein
the MAC layer instructs the PHY layer, on the second semi-persistent uplink sending resource, to retransmit the first data buffered in the HARQ process.

20. A non-volatile computer-readable storage medium, wherein the non-volatile computer-readable storage medium stores a computer program, and when the computer program is executed by a processor, the processor is configured to implement the following step:

if a physical (PHY) layer has not sent first data on a first semi-persistent uplink sending resource after a media access control (MAC) layer of the terminal buffers first data to a hybrid automatic repeat request (HARQ) process, and instructs the PHY layer to send the first data on the first semi-persistent uplink sending resource, transmitting, by the PHY layer, a non-sending indication to the MAC layer;

instructing, by the MAC layer, the PHY layer to transmit second data on a second semi-persistent uplink sending resource upon receiving the non-sending indication; and sending, by the PHY layer, the second data on the second semi-persistent uplink sending resource, wherein the second data is the first data buffered in the HARQ process, or the second data is data corresponding to the first data buffered in the HARQ process, and the non-sending indication is used to indicate that the PHY layer has not sent the first data on the first semi-persistent uplink sending resource.

\* \* \* \* \*

UNITED STATES PATENT AND TRADEMARK OFFICE
CERTIFICATE OF CORRECTION

| | |
|---|---|
| PATENT NO. | : 12,016,023 B2 |
| APPLICATION NO. | : 17/333144 |
| DATED | : June 18, 2024 |
| INVENTOR(S) | : Yumin Wu and Wei Bao |

It is certified that error appears in the above-identified patent and that said Letters Patent is hereby corrected as shown below:

On the Title Page

Under (63) Continuation of application: delete the words "Continuation of application No. PCT/CN2019/121232, filed on Nov. 17, 2019." and insert --Continuation of application No. PCT/CN2019/121232, filed on Nov. 27, 2019.--

Signed and Sealed this
Thirtieth Day of July, 2024

Katherine Kelly Vidal
*Director of the United States Patent and Trademark Office*